US011521242B2

(12) United States Patent
Mao et al.

(10) Patent No.: US 11,521,242 B2
(45) Date of Patent: Dec. 6, 2022

(54) ASYNCHRONOUS EXECUTION OF TASKS AND ORDERING OF TASK EXECUTION

(71) Applicant: META PLATFORMS, INC., Menlo Park, CA (US)

(72) Inventors: Yiqiang Mao, Seattle, WA (US); Liangxiao Zhu, Redmond, WA (US); Marcin Przysucha, Redmond, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 442 days.

(21) Appl. No.: 15/252,542

(22) Filed: Aug. 31, 2016

(65) Prior Publication Data

US 2018/0060376 A1 Mar. 1, 2018

(51) Int. Cl.
*G06Q 30/02* (2012.01)
*G06F 16/958* (2019.01)

(52) U.S. Cl.
CPC ....... *G06Q 30/0276* (2013.01); *G06F 16/958* (2019.01)

(58) Field of Classification Search
CPC ......... G06F 17/30371; G06F 17/30377; G06F 17/30368; G06F 16/958; G06Q 30/0276
See application file for complete search history.

(56) References Cited

U.S. PATENT DOCUMENTS

| 6,823,338 | B1* | 11/2004 | Byrne | G06F 21/6227 |
| 6,834,279 | B1* | 12/2004 | Chiang | G06F 16/24542 |
| 7,739,316 | B2* | 6/2010 | Thompson | G06F 16/284 707/825 |
| 2007/0100830 | A1* | 5/2007 | Beedubail | G06F 16/23 |
| 2008/0120298 | A1* | 5/2008 | Duffy | G06F 9/467 |
| 2012/0023295 | A1* | 1/2012 | Nemawarkar | H04L 47/621 711/130 |
| 2012/0185449 | A1* | 7/2012 | Gould | G06F 16/2365 707/695 |
| 2012/0268786 | A1* | 10/2012 | Noguchi | G03G 15/50 358/1.15 |

(Continued)

OTHER PUBLICATIONS

Bilschak (Bilschak et al. "A Quick Introduction to Version Control with Git and GitHub". PLOS Computational Biology. Jan. 19, 2016. pp. 1-18). (Year: 2016).*

*Primary Examiner* — William B Partridge
*Assistant Examiner* — Aryan D Toughiry

(57) ABSTRACT

An online system uses a task async engine to coordinate task execution, such as for phased content creation, where the system enables content providers to efficiently create and publish sponsored content in multiple phases. Each phase of the content creation is represented by a draft of the content. Multiple drafts of the content are stored in a repository of the online system for optimizing content delivery and publication, such as quick identification of conflicts in a draft based on analysis of draft fragments of the draft. Objects associated with the sponsored content are stored in an object model. The connections amongst the various draft segments of a draft are stored in a hierarchy structure. Each user associated with a draft has a role, where all of the roles can contribute to the draft. The online system efficiently publishes the drafts and presents the sponsored content to its target users.

19 Claims, 9 Drawing Sheets

(56) References Cited

U.S. PATENT DOCUMENTS

| | | | |
|---|---|---|---|
| 2012/0304024 A1* | 11/2012 | Rohleder | G06F 9/38 |
| | | | 714/49 |
| 2014/0195892 A1* | 7/2014 | Hampton | G06F 16/958 |
| | | | 715/234 |
| 2017/0277905 A1* | 9/2017 | Bjorg | G06F 3/0486 |
| 2018/0091583 A1* | 3/2018 | Collins | H04L 41/5003 |

* cited by examiner

ASYNCHRONOUS EXECUTION OF TASKS AND ORDERING OF TASK EXECUTION

BACKGROUND

1. Field of Art

This disclosure generally relates to asynchronous execution of tasks, and particularly to asynchronous task execution and ordering of tasks to, for example, efficiently create and execute drafts associated with sponsored content in an online system.

2. Description of the Related Art

Within an online system, such as a social networking system, there are a number of tasks that must be executed, and if the online system is busy, the wait time for various tasks can be rather long. When a task fails, the user may be notified that the task failed and must re-submit the task, thus creating further delay and possibly requiring another long wait in a queue for other tasks to be completed first. One example of a common task is a task relating to content creation. Content providers create content that is targeted to certain audiences within an online system, where users of the online system interact with the content received from the online system, e.g., clicking, sharing, watching a video, subscribing to a service, or purchasing a product described by the content. Content providers have increasingly relied on the online systems, such as social networking systems, to create effective sponsored content within the online system to greatly increase engagement among users of the online systems. For example, an online system tracks how often users interact with the presented content and collects statistics for the content. Based on these statistics, the content provider can revise content items or generate new content items. Online systems can provide an interface for content providers to create content to be delivered to user of the online system, and the users can create tasks associated with this content creation. However, it is a problem when a task fails during creation or publishing of this content, such that the content never publishes, or the failed or incomplete content publishes instead of the correct content. Existing solutions do not allow for the same content item to be created over multiple phases before being published in the online system, or for one content item to be edited or modified by several users associated with the content provider prior to the content item being published. Additionally, existing solutions can be vulnerable to connection interruptions between the content provider and the online system, as in-progress changes to a content item are stored locally on the content provider's system and not on the online system. For example, an error in content creation for an early change can result in the entire content creation process failing.

SUMMARY

An online system includes an asynchronous engine or task async engine that allows tasks to be executed in a way that takes into account how busy the online system is currently, considers the best order of task execution, and allows a failed task to be automatically repeated by the system rather than just being allowed to fail. Examples of tasks that the async engine allows to be performed more efficiently are tasks associated with content creation, and specifically a phased content creation provided by the online system. The online system enables content providers to efficiently create and publish sponsored content in multiple phases. Each phase of the creation is represented by a draft of the content. Multiple drafts of the content are stored in a repository of the online system, which enables the online system to optimize content delivery and publication, such as quick identification of point of failure in the multiple drafts and shortening execution time. For each draft, objects associated with the sponsored content are stored by the online system, including a container and multiple draft segments, and the objects can be stored in the form of a key-value table. The connections amongst the various draft segments and the connections between the container and the draft segments are stored in a hierarchy structure, e.g., a tree structure. Thus, when a child node is created (e.g., for a draft segment), a pointer to its parent is saved with the child node. Each user associated with a draft has a role, such as an owner or a collaborator, where all of the roles can contribute to the draft and the owner acts as an administrator for the content and can transfer ownership to others.

The task async engine of the online system allows tasks (e.g., Application Programming Interface (API) calls for publishing draft fragments, drafts and sponsored content) to be executed in a way that takes into account how busy the online system is currently, considers the best order of task execution, and allows a failed task to be tried again rather than just being allowed to fail.

The task async engine is configured to publish drafts of sponsored content. The task async engine has an execution module and a conflict module along with an execution log to store data related to publishing drafts of the sponsored content. The execution module receives one or more drafts associated with the sponsored content from the content provider, where each of the drafts represents a phase of the creation of the sponsored content, and where and each draft includes one or more changes made to the sponsored content. A change to a content object of the sponsored content is represented by a draft fragment. The execution module learns the internal states of all of the content objects of the sponsored content from the corresponding structure, e.g., the object model storing the content objects of the sponsored content. The task async engine executes drafts associated with sponsored content and creates objects corresponding to the hierarchical structure of the sponsored content (e.g., campaign, content item set and content items).

The conflict module evaluates drafts and their associated draft fragments associated with the sponsored content to identify any conflict before publishing the drafts of the sponsored content. In one embodiment, the conflict module determines whether a content object of the sponsored content was changed by a draft fragment. For example, when a draft fragment is created for an existing content object (e.g., campaign object), the drafts module of the content drafting system computes a hashcode for the content object (e.g., by concatenating all the fields of the content object and applying a hash scheme, such as MD5 hash) to the concatenated fields. The drafts module stores the hashcode value of the content object in the draft fragment object.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
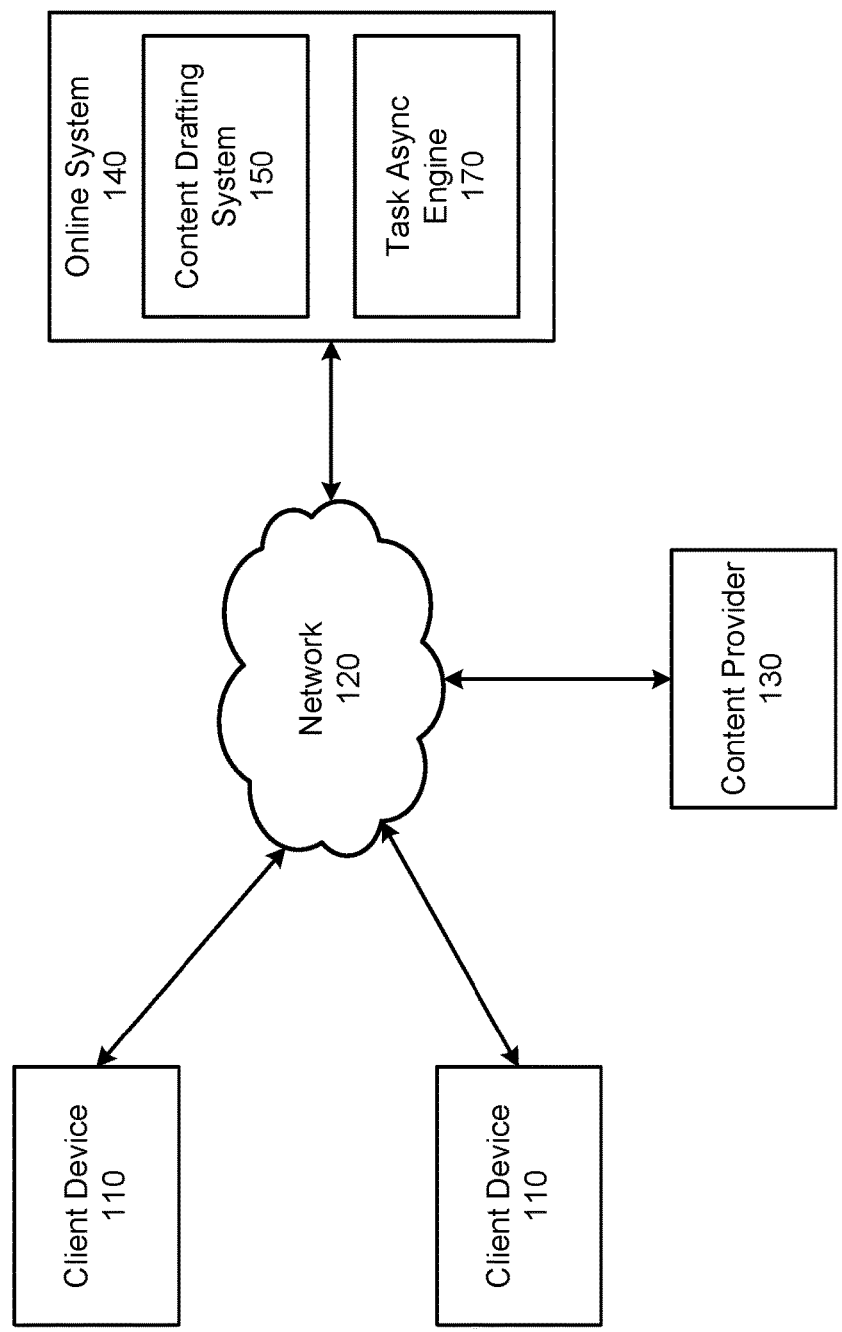
FIG. 1 is a block diagram of a system environment for content creation in phases utilizing a content drafting system according to one embodiment.

FIG. 1 is a block diagram of a system environment for content creation in places utilizing a content drafting system 150, according to one embodiment. The system environment includes multiple client devices 110, a content provider 130, and an online system 140 including a content drafting system 150 and a task async engine 170 connected to each other over a network 120. In other embodiments, different and/or additional entities can be included in the system environment. For example, multiple content providers 130 can be connected to the online system 140 by the network 120.

The online system 140 allows users of the online system 140 to communicate or otherwise interact with each other and access content items provided by the online system 140 and/or the content provider 130 through users' client devices 110. In one embodiment, the online system 140 is a social networking system. In some implementations, the content providers 130 provide content items, e.g., advertisements, for display to users of the online system 140 (hereinafter "sponsored content"). Content providers 130 can interact with the online system 140 through the content drafting system 150 to generate or modify content items for presentation to users of the online system 140.

The client device 110 is a computing device capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The network 120 includes any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A content provider 130 is a computing device or server capable of transmitting and/or receiving data via the network 120. A content provider 130 provides content items to the online system 140 or interacts with the online system 140 to generate content items, e.g., sponsored content, for presentation to users of the online system 140. In some implementations, content items associated with a content provider 130 are presented to users of the online system 140 as sponsored content. In other embodiments, content providers 130 or the online system 140 designate certain content items as sponsored content, for example, based on a creator of the content item or a content provider 130 associated with the content item. A content provider can be associated with one or more creators (not shown), and a creator associated with a content provider 130 is authorized to modify content items associated with the content provider. In some embodiments, a creator is a user authorized to interact with the content drafting system 150 or the task async engine 170 on behalf of the content provider 130.

The content drafting system 150 is used by content providers 130 to interact with the online system 140. Examples of interactions include providing or modifying content items, components of a content item (also referred to as "component creatives" or simply "creatives"), and information related content items or creatives. For example, a content provider 130 can use the content drafting system 150 to provide one or more content items and/or creatives to be included in a content item to the online system 140. A content item may be sponsored content such as advertisements sponsored by advertisers or social networking content sponsored by social networking users (e.g., where a user pays the social networking system to boost the ranking of a post by the user or another user on the social networking system). For example, a creative of a content item can be an image, video, body representing the primary message of the content item, a type of call_to_action (e.g., shop_now, learn_more, etc.), title representing a short headline in the content item, description representing secondary message of the content item, universal resource locator (URL), or caption representing corresponding text of an URL.

In some embodiments, a content provider 130 can create sponsored content in multiple phases through the content drafting system 150 of the online system 140. Each phase of the creation is represented by a draft of the sponsored content. Multiple drafts of the sponsored content are stored in a repository of the content drafting system 150, which enables the content drafting system 150 to optimize content delivery and publication, such as quick identification of point of failure in the multiple drafts and shortening execution time. For each draft, objects including a container and multiple draft segments associated with the sponsored content are stored by the content drafting system 150. In some embodiments, the objects are stored in the form of key-value table.

II. Online System

Figure 2:
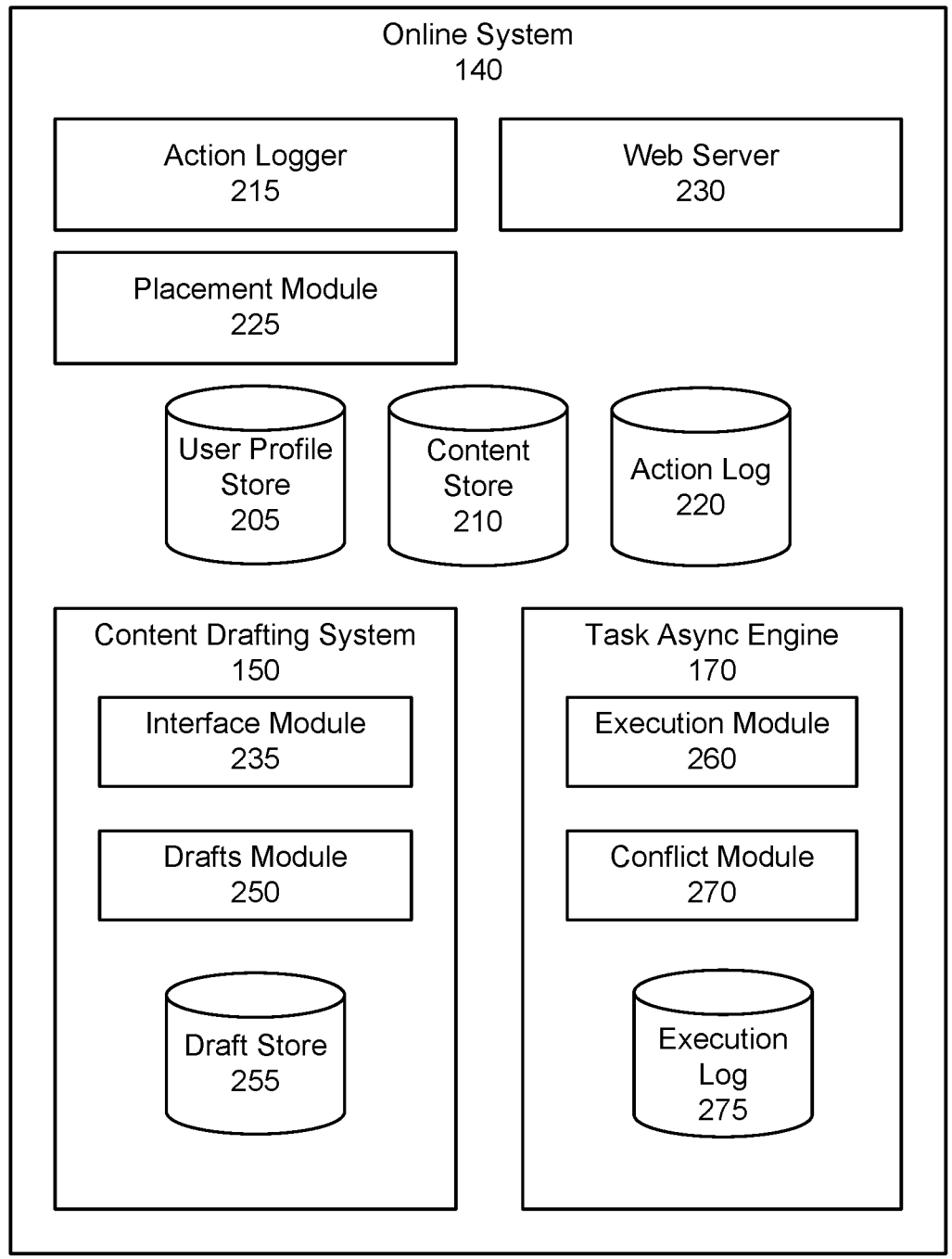
FIG. 2 is a block diagram of an online system for content creation in phases including a content drafting system according to one embodiment.

FIG. 2 is a block diagram of an online system 140 for content creation and execution in phases including a content drafting system 150 and a task async execution engine 170, according to one embodiment. The online system 140 includes a user profile store 205, content store 210, action logger 215, action log 220, placement module 225, web server 230, content drafting system 150, and task async engine 170. In other embodiments, the online system 140 may include additional, fewer, or different modules for various applications such as an edge store and/or a newsfeed manager (not shown).

The user profile store 205 stores user profiles associated with each user of the online system 140. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on the online system 140. The user profile store 205 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 205 can store user profiles associated with individuals, as well as user profiles associated with entities such as businesses or organizations, e.g., an entity associated with a content provider 130. This allows an entity to establish a presence on the online system 140 for connecting and exchanging content with other users of the online system 140. The entity may post information about itself, about its products, or provide other information to users of the online system 140 using a brand page associated with the entity's user profile. Users of the online system 140 may connect to the brand page to receive information posted to the brand page or to receive information from the brand page. A user profile associated with the brand page may include information about the entity itself, providing users with background or informational data about the entity.

The content store 210 can store content objects associated with content items for presentation to users of the online system 140. In one embodiment, a sponsored content item has multiple content objects describing various aspects of the sponsored content item. Examples of content objects associated with a sponsored content item include an admarket object (e.g., a content group object, a content campaign object, a content item set object, or a creative object), a draft object (also referred to as "draft," which is a top level container for the sponsored content item), a draft fragment object (which holds a state of an admarket object, such as a campaign, content item set, or creative), a creator object (e.g., an editor who is currently able to edit a draft, or an owner who is synonymous with editor and is the only person who can edit a draft), a state object describing current state of draft fragments (e.g., save—persist changes into the draft fragments, not the admarket objects; publish—persist changes from draft fragments to admarket objects; conflict—if fields changed in a draft fragment are related to fields updated in admarket objects after the draft was created; database query—a query executed against non-draft objects, i.e., admarket objects or published data). Each content object associated with a sponsored content item can be stored in the format of key-value pair, where the value can be modified through the creation phases.

A content item in the content store 210 can be associated with an individual user, a content provider, or one or more creators as well as other content objects of the content store 210. In some embodiments, the content store 210 includes content items provided to the online system 140 by a content provider 130 or associated creator, or content items generated by content providers 130 using the content drafting system 150. For example, the content item store 210 can include sponsored content. Content items of the content item store 210 can be associated with additional information, for example, a content provider 130, a creator, other content items in the content item store 210, or a set or group organizing content items. For example, content items associated with a campaign can be stored using a hierarchical data model with multiple levels, e.g., a multi-level tree structure. In one embodiment, the hierarchical data model has at least three hierarchical levels; a content group level of content group objects, a content item set level of content item set objects, and a content item level of content item objects. Each campaign object can have one or more child content item set objects; each content item set object includes one or more child content item objects; and each content item object has one or more child creative objects (e.g., images, text, URLs, titles, etc.)

For example, a content provider wants to create a campaign for NIKE® running shoes, which includes a few content item sets, e.g., NIKE® Pro 6 running shoes set and NIKE® Ultimate running shoes set. Within each content item set, the content provider can have a number of different content items. For example, within NIKE® Pro 6 running shoes set, the content provider can have a content item including an image of NIKE® Pro 6 running shoes and corresponding text for men and another content item including an image of NIKE® Pro 6 running shoes for women and a different corresponding text.

At each level of hierarchical model, a content provider 130 or creator can specify certain information concerning the content creation at that level, such as optimization goals for each level. Each child content object in the hierarchical model stores a "pointer" to its parent content object. In some implementations, the information specified at each level of the hierarchical model is applied to all content objects under that level by the online system 140. For example, at the content item set level, a content provider 130 or creator provides all of the information at that level to be applied across all content items in the content item set (e.g., bid, budget, billing event, optimization goals, etc.). Similarly, at the content item level, the content provider can provide information describing the one or more creatives to be included in the content item, without repeating the information disclosed on the parent level above, e.g., the content item set level.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

In some embodiments, the action log 220 is used by the online system 140 to track user actions on the online system 140, as well as actions on third party systems that communicate information to the online system 140. Users may interact with various objects on the online system 140, and the action logger 215 stores information describing these interactions in the action log 220. Examples of interactions with objects include: commenting on posts, sharing links, and checking-in to physical locations via a mobile device, accessing content items, and any other interactions. Additionally, the action log 220 may record a user's interactions with sponsored content on the online system 140 as well as with other applications operating on the online system 140.

An edge store (not shown in FIG. 2) stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. In some embodiments, Users and objects within the online system 140 are represented as nodes in a social graph that connected by edges stored in the edge store.

The placement module 225 selects content items to be presented for display to users of the online system 140, for example, based on a detection of a user logging into the online system 140. Content items can be selected from the content store 210 for presentation to a user of the online system 140. For example, content items can be selected based on a topic of the content item, stored interactions with the content item from the action log 220, association with a content item set, content group, or other content object, or any other suitable factor. In some embodiments, each content item has a content value for representing the compensation (e.g., monetary value) received by the online system 140 if the candidate content item is presented to the target user and/or if the target user interacts with the candidate content item. Different pricing models may be used to determine the content value, such as a cost-per-click (i.e., "CPC") model where the content value is based on a per-user-interaction with the candidate content item, or a cost-per-impression (i.e., "CPI") model where the content value is based on the number of times a candidate content item is presented. In some implementations, content items can include sponsored content provided by a content provider 130.

In one embodiment, the online system 140 presents content items, including sponsored content, to a user as stories through a "newsfeed" presented to the user. A story presented to a user can describe an action taken by an additional user connected to the user and identifies the additional user. In some embodiments, a story describing an action performed by a user may be accessible to users not connected to the user that performed the action. The newsfeed manager (not shown in FIG. 2) may generate stories for presentation to a user based on information in the action log 220 and in edge store and content items of the content store 210.

The web server 230 links the online system 140 via the network 120 to the one or more client devices 110 as shown in FIG. 1. The web server 230 serves web pages, as well as other web-related content, such as web-content written in JAVA®, FLASH®, XML and so forth. The web server 230 may receive and route messages between the online system 140 and the client device 130, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 205. Additionally, the web server 230 may provide application programming interface (API) functionality to send data directly to native client device operating systems, such as IOS®, ANDROID™, WEBOS® or RIM®.

III. Content Drafting System

The content drafting system 150 enables content providers 130 to efficiently create sponsored content in multiple phases. Each phase of the creation is represented by a draft of the content. Multiple drafts of the content are stored in a repository of the content drafting system 150. In the embodiment illustrated in FIG. 2, the content drafting system 150 includes an interface module 235, drafts module 250, and draft store 255. In other embodiments, the content drafting system 150 may include additional, fewer, or different modules for various applications.

In some embodiments, the content drafting system 150 provides an interface, e.g., a graphical user interface for content item creation, to content providers 130 and authorized creators, to allow the content providers 130 or creators to upload, modify, generate, or otherwise interact with various content objects as associated with content items of the online system 140. Content providers 130 can control certain aspects of the presentation of content items to users of the online system 140 through additional information associated with content items, for example, a hierarchical model relating a plurality of content items and other content objects containing instructions for the presentation of those content items.

The content drafting system 150 can allow a content provider 130 or creator to create sponsored content through multiple phases. In one embodiment, the content drafting system 150 uses a content object model for the multi-phase creation of a sponsored content item. A content provider 130, or an authorized user associated with the content provider 130 can have many drafts of a sponsored content item, where the content provider 130 or the authorized user is the original owner of the sponsored content item. The original owner can authorize other editors/authors to make changes to the drafts of the sponsored content item by changing the ownership and each of the original owner, the current owner and associated editors is identified with a unique identifier and associated with each other by storing information describing the association.

A draft of the sponsored content item represents one phase of the content item creation. A draft of the sponsored content has one or more draft fragments. Each draft has one or more fields, for example including: name of the draft, creator, version number, updated timestamp (for updates to the draft), summary (a text field), association to subscribers (e.g., previous authors will automatically become subscribers), and creation time. Each field is identified by a key (e.g., a textual field name), and has a value (e.g., a numeric value or some text description). In one embodiment, the value is a tuple including an old value of the field and a new value of the field.

A draft fragment holds a state of an admarket object (e.g., campaign, content item set, content item). In some embodiments, a state of an admarket object is defined by the values of fields of the admarket object. A draft fragment can hold a state of an admarket object by containing values that are used to update the fields of the admarket object. Each draft fragment has one or more fields, including: identification, admarketID (an ID of an existing or to-be-created admarket object associated with the draft fragment), action (one of add, modify and delete), data values (key-value (old and new) of fields of the admarket object), hashcode (only set on draft fragments for existing admarket objects, represents a state of the admarket object at the time the draft fragment was created), created time (timestamp of fragment creation), last modified (timestamp of last save), type (created explicitly or implicitly), and version.

Each field of a draft fragment is identified by a key, e.g., a textual field name, and has a value (e.g., a numeric value or some text description). In one embodiment, the value is a tuple consisting old value of the field and new value of the field. New/updated values of fields of a draft fragment persist in the draft fragment until publish time. When a draft fragment is published, the associated admarket object can be updated to reflect the state of the admarket object held in the draft fragment, for example, by updating the values of fields of the admarket object with the values stored in the draft fragment.

An admarket object (e.g., a content group object, content item set object or content item object) can have one or more draft fragments; an existing admarket object can be the subject of multiple drafts, and, in some implementations, admarket objects are created at publish time based on a draft or draft fragment. A content provider 130 or associated creator publishes a draft by clicking a "publish" or "submit" button on a draft creation interface presented to the content provider 130. While a draft is being published, the content provider 130 is prevented from navigating around the draft and making any additional changes to the draft. After a draft has been published, the content provider 130 can re-edit the published draft or delete the published draft. After an admarket object (e.g., campaign), has been published, where the materialized changes represented by its associated draft fragments, the draft and draft fragments associated with the admarket object can be destroyed, e.g., removed from the draft store 255.

The interface module 235 allows the content drafting system 150 to communicate with content providers 130 or creators associated with the content provider 130 over the network 120. In one embodiment, the interface module 235 presents a graphical user interface (GUI), e.g., a draft drawer or bar, to the content provider 130 for creating sponsored content. The interface has a button for the content provider 130 to turn on or off a draft mode. Turning on the draft mode enables the content provider 130 to create, modify or delete draft fragments associated with an admarket object by modifying values of one or more fields of the draft fragments. The changes to the values of the fields of a draft fragment are persistent until the draft fragments are published. The draft drawer/GUI may have additional tools for the content provider 130 to cancel changes, discard changes or publish changes. The draft drawer/GUI displays a variety of warnings or reminders regarding the creation of the sponsored content. An example reminder shows a message as follows to the content provider 130: "You have 8 unpublished changes." In response to detection of a conflict during the creation, e.g., deleting a parent or grandparent content object by updating a child content object through a draft fragment, the draft drawer/GUI displays a warning message and/or a link to the child object that caused the conflict. The interface module 235 can receive and route messages, interactions, updates associated with the creation of the sponsored content between the content providers 130 or its creators and the content drafting system 130.

The drafts module 250 manages drafts, draft fragments, creators, states and actions associated with creation of sponsored content. In one embodiment, the draft module 250 represents the drafts, draft fragments, creators, states and actions associated with creation of sponsored content in an object model, where a draft is a top level container for the sponsored content creation, and a draft fragment holds state for a content object of the sponsored content, e.g., content item set object. Each draft, draft fragment, creator, state and action is stored as an object in the object model, each of which has one or more fields and each field has at least one value. In one embodiment, the key-value tuples associated with each content object are stored in a table. The drafts, drafts fragments and associated elements, e.g., creators, states, and actions, are stored in the draft store 255

A draft can be associated with a content provider 130 as a creator of the draft. In some implementations, only a creator associated with the draft can view or modify that draft. For example, a creator who initially created a draft is considered an owner of the draft and retains the ability to modify the draft. The owner of a draft can transfer ownership of the draft to another creator associated with the same content provider 130. In some embodiments, an owner of a draft can associate other creators as collaborators, enabling the collaborators to edit the draft. For example, an authorized user associated with the content provider 130 creates a sponsored content item with an image, but no title, text, targeting user and budget information, with the content drafting system 150. The creation of the content item is saved as a draft of the content item by the content drafting system 150. The authorized user as an original owner of the draft assigns the draft to the next person in the creation process, who adds the title/text/targeting user/budget information to the draft. The creation process continues with more changes being added by same or different editors until the draft of content item is ready for final review by an approver, e.g., a marketing director associated with the content provider 130. The approver either requests the content drafting system 150 to publish the final draft or to assign it to someone else for further changes.

A draft fragment describes one or more changes made to a content object of sponsored content during the creation of the sponsored content by a content provider 130. In some embodiments, a draft fragment can describe a change to a new content item, content item set, or content group associated with the sponsored content to be created. Similarly, a draft fragment can also describe only a change or modification to an existing object, for example a content item, of the sponsored content. For example, a draft fragment is created for an admarket object, Campaign with a name of "First", and a value of "12345" with a new name of "Woohoo": Campaign, "123435"→old_name: "First," new_name: "Woohoo."

Draft fragments can contain additional data, such information about a creator of the draft fragment, a time or date of creation or modification of the draft fragment, or instructions about when to publish the changes made by the draft fragment to the associated content object, e.g., a content item. Draft fragments can also be associated with other draft fragments. For example, a draft fragment describing a modification of a content item set can be associated with a draft fragment describing an additional content item to add to the content item set. In some embodiments, each draft fragment is associated with a corresponding admarket object of the sponsored content, e.g., campaign, content item set or creative of a content item. In some embodiments, a draft fragment is associated with a placeholder object of the sponsored content. The placeholder object can be created when a draft fragment is created and can be a blank or null object, a default object, or any other suitable object. Drafts and draft fragments will be discussed further in relation to FIGS. 4 and 5.

Figure 3:
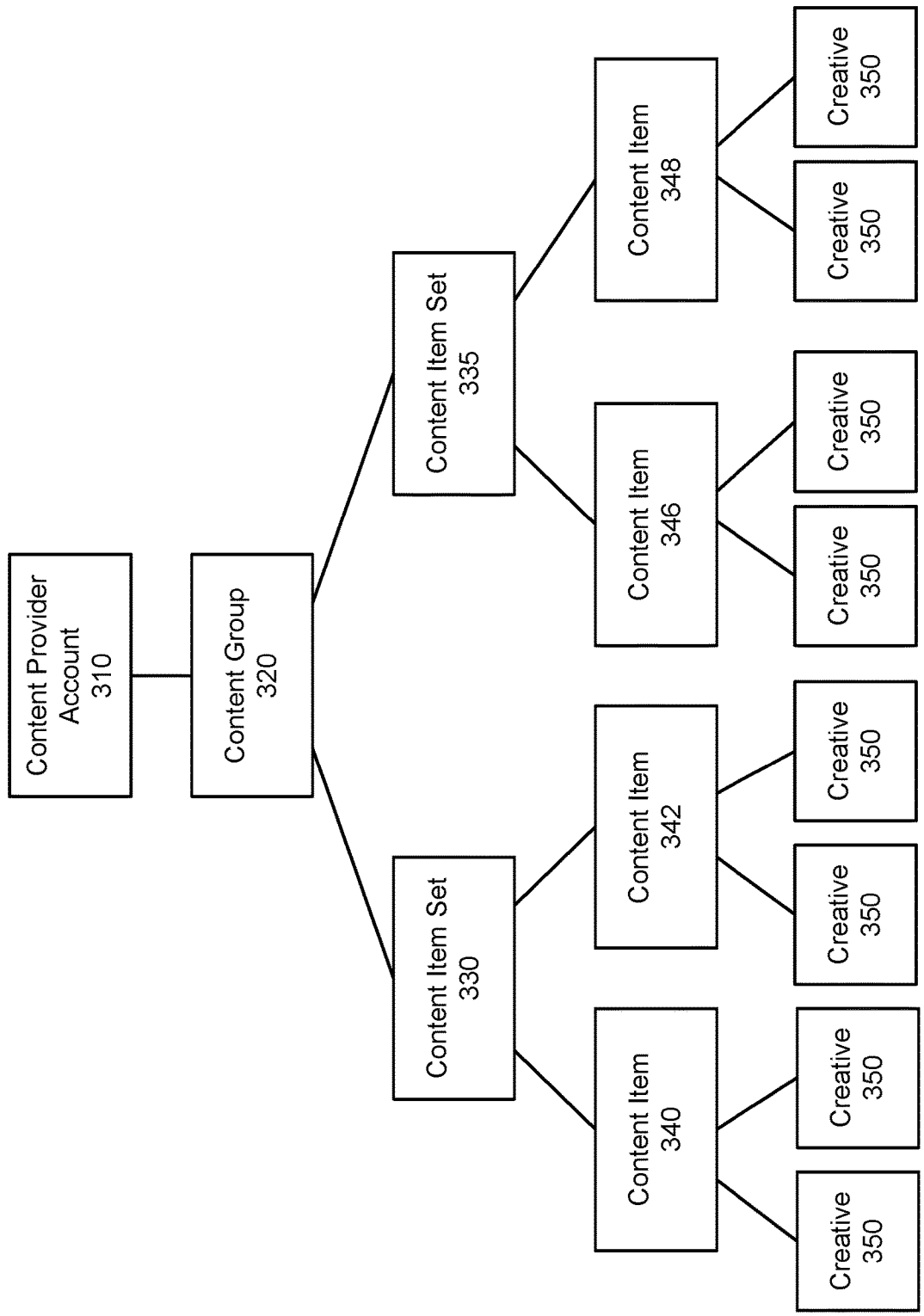
FIG. 3 is a block diagram illustrating an example data structure for content items of a content drafting system, according to one embodiment.

FIG. 3 is a block diagram illustrating an example data structure 300 for content items of a content drafting system 150, according to one embodiment. For example, the content store 210 can store content items and additional information in the data structure 300. The data structure 300 is a hierarchical model including a content provider account 310, a content group 320, content item sets 330 and 335, content items 340, 342, 346, and 348 and creatives 350 to be included in the content items.

The content provider account 310 is an account associated with a content provider 130. The content provider account 310 can additionally be associated with one or more creators associated with the content provider 130 of the content provider account 310. The creators may be, for example, owners or managers of a business. In some implementations, the content provider account 310 identifies an owner of a draft of sponsored content, e.g., content item 340.

Additionally, the content provider account 310 can be associated with one or more content groups, such as the content group 320. As described above, a content group is a collection of content item sets, i.e., associated with one or more content item sets. In FIG. 3, the content group 320 is associated with the content item sets 330 and 335. A content group 320 can be associated with one or more parameters relating to the content item sets. For example, in some embodiments, a content group 320 represents an advertising campaign. The advertising campaign can have a business object, an objective, a campaign spending cap, and a campaign duration. The campaign spending cap can indicate a maximum budget that the corresponding campaign can spend on publishing content items on the online system 140. The campaign duration indicates a period of time during which the content items of the content items sets associated with the campaign will be presented to users of online system 140. Information of the advertising campaign controlling subsets of the content items associated with the campaign can be stored in the content item sets 330 and 335 associated with the content group 320.

A content item set is a collection of content items, i.e., associated with one or more content items such as the content item 340 of the data structure 300. In the example of FIG. 3, the content item set 330 is associated with content items 340 and 342, and the content item set 335 is associated with the content items 346 and 348. Content item sets can be associated with one or more parameters governing the presentation of associated content items to users of the online system 140.

A content item such as the content items 340, 342, 346, and 348 of FIG. 3 can include one or more creatives. For example, a content item includes an image of a product and a body of text describing the product. A content item can also be associated with various parameters, for example, describing one or more demographics of user to which the content item will be presented, or containing a list of users to which the content item has already been shown In an example use case, a creator (e.g., business owner) of the content provider account 310 generates a campaign promote a science fair at a high school as the first content group 320 and a campaign to promote a school fundraiser as a second content group (not shown). Further, for the content group 320, the creator generates the content item set 330 to organize content items targeted to students attending the science fair and the content item set 335 to organize content items targeted to sponsors of the science fair. The creator provides the content items 340 and 342 targeted to students, for example, a content item including a photo of an erupting volcano and a content item including a photo of a robotic racecar. Similarly, the creator provides the content items 346 and 348 targeted to sponsors, for example, a content item including a photo of a chemistry science fair project and the text "increase exposure of your company through a science fair sponsorship."

Figure 4:
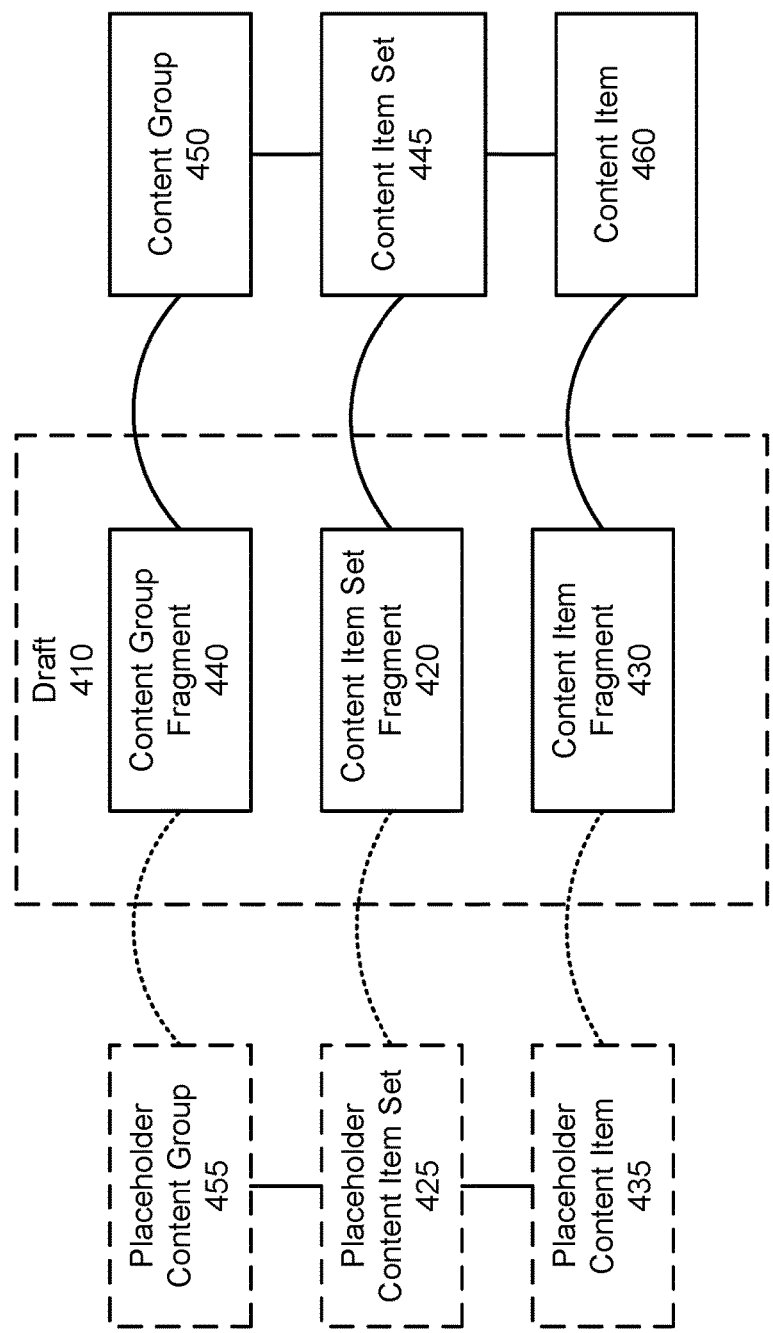
FIG. 4 is a block diagram illustrating an example data structure for drafts of sponsored content created by a content drafting system, according to one embodiment.

FIG. 4 is a block diagram illustrating an example data structure for drafts of a content drafting system 150, according to one embodiment. The draft data structure 400 includes a draft 410, content item set fragment 420 and placeholder content item set 425, content item fragment 430 and placeholder content item 435, content group fragment 440 and placeholder content group 455, content group 450, content item set 445, and content item 460.

The draft 410 of FIG. 4 is includes several draft fragments, including a content item set fragment 420, a content item fragment 430, and a content group fragment 440. Each draft fragment, e.g., 420, 430 and 440, of the draft 410 is created to make a change to its associated content object of the sponsored content. For example, the content group fragment 410 is created to make a change to content group object 450; content item set fragment 420 for the content item set object 445, and content item fragment 430 for the content item object 460. Each draft fragment, e.g., 420, 430 and 440, is associated its corresponding placeholder, e.g., 425, 435 and 455, which are used by the content drafting system 150 to reference the draft fragments and persist values of fields modified by the draft fragments before being published.

In some embodiments, drafts are stored in a multiple-level key-value table, with each row of the table representing a different draft fragment associated with the draft. For example, the draft 410 can be associated with a key value table with rows for the content item set fragment 420, the content item fragment 430 and the content group fragment 440. Each row of the key-value table can contain pointers referring to any associated draft fragments. For example, the row for the content item fragment 430 can contain a pointer to the row representing the content item set fragment 420.

Each draft fragment associated with the draft 410 is also associated with a content object of the sponsored content, for example, the content group fragment 440 is associated with the content group object 450 and the placeholder content group object 455. The content group fragment 440 represents a modification to the content group object 450, for example, to change a parameter of the content group object 450. The content item fragment 430 is associated with the placeholder content item object 435, a placeholder object. As described above, a placeholder object provides a location in the content store 210 for implementation of persisting changes made to the content object associated with a draft fragment. For example, the placeholder content item 435 is created for the content item fragment 430; when the content item fragment 430 is published the resulting content item can be generated and stored in the location of the placeholder content item 135 in the content store 210. A placeholder object can allow changes to be published persistent prior to the publication of the draft.

Figure 5:
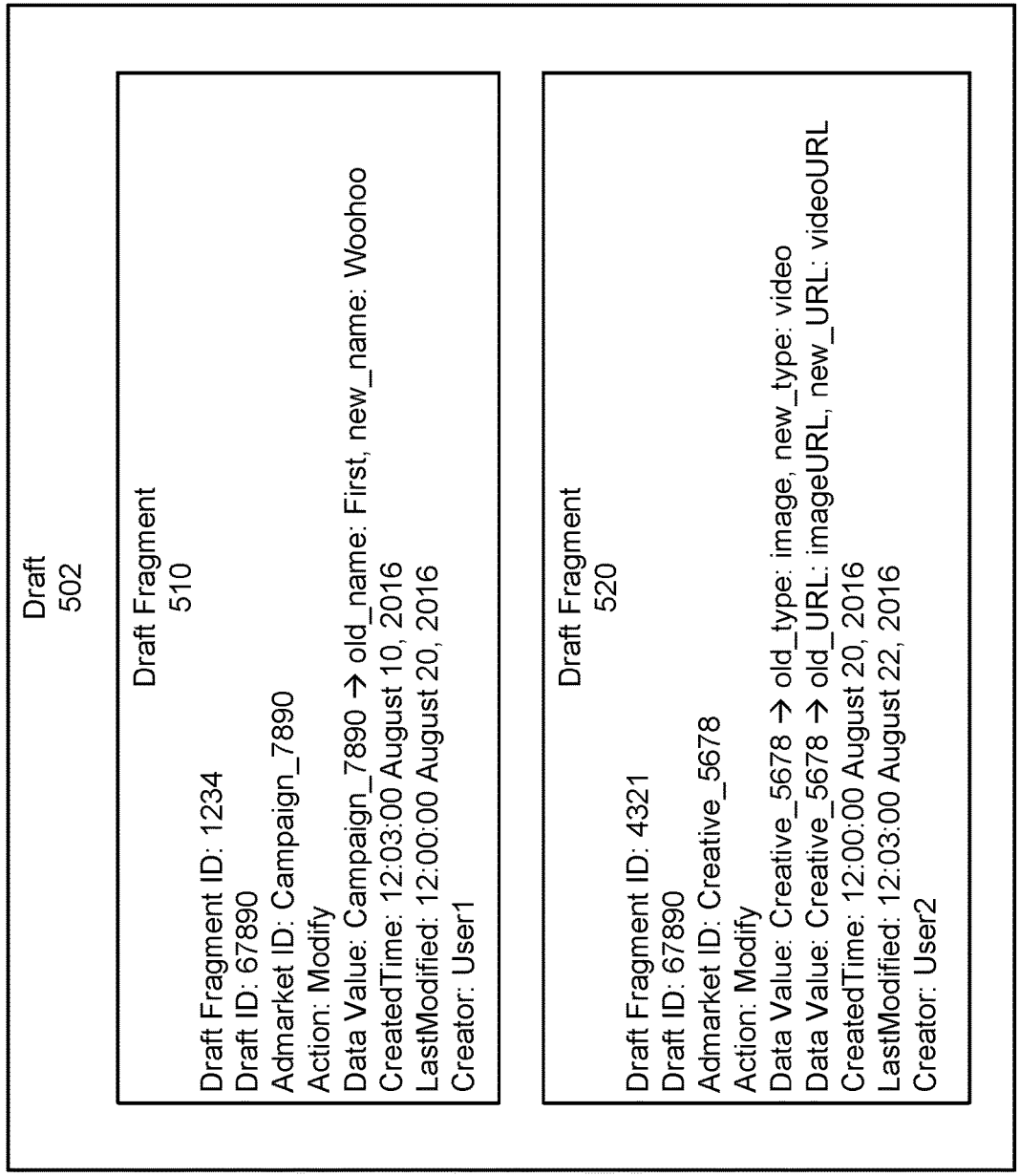
FIG. 5 illustrates an example draft having two draft fragments of a sponsored content created by the content drafting system, according to one embodiment.

FIG. 5 illustrates an example draft 502 having two draft fragments 510 and 520 of sponsored content created through a content drafting system 150, according to one embodiment. The draft 520 has a draft fragment 510 associated with a content object, e.g., Campaign 7890, of the sponsored content. The draft fragment 510 modifies name of Campaign 7890: changing it from "First" to "Woohoo." The draft fragment 510 was created by a creator identified as "User1." The draft 502 also has a draft segment 520 associated with a content object, e.g, Creative_5678, of the sponsored content. The draft fragment 520 modifies type of Creative 5678, i.e., changing the type of the creative "Image" to "Video," and updates the URL for the creative. The draft fragment 520 was created by a creator identified as "User2."

Figure 6:
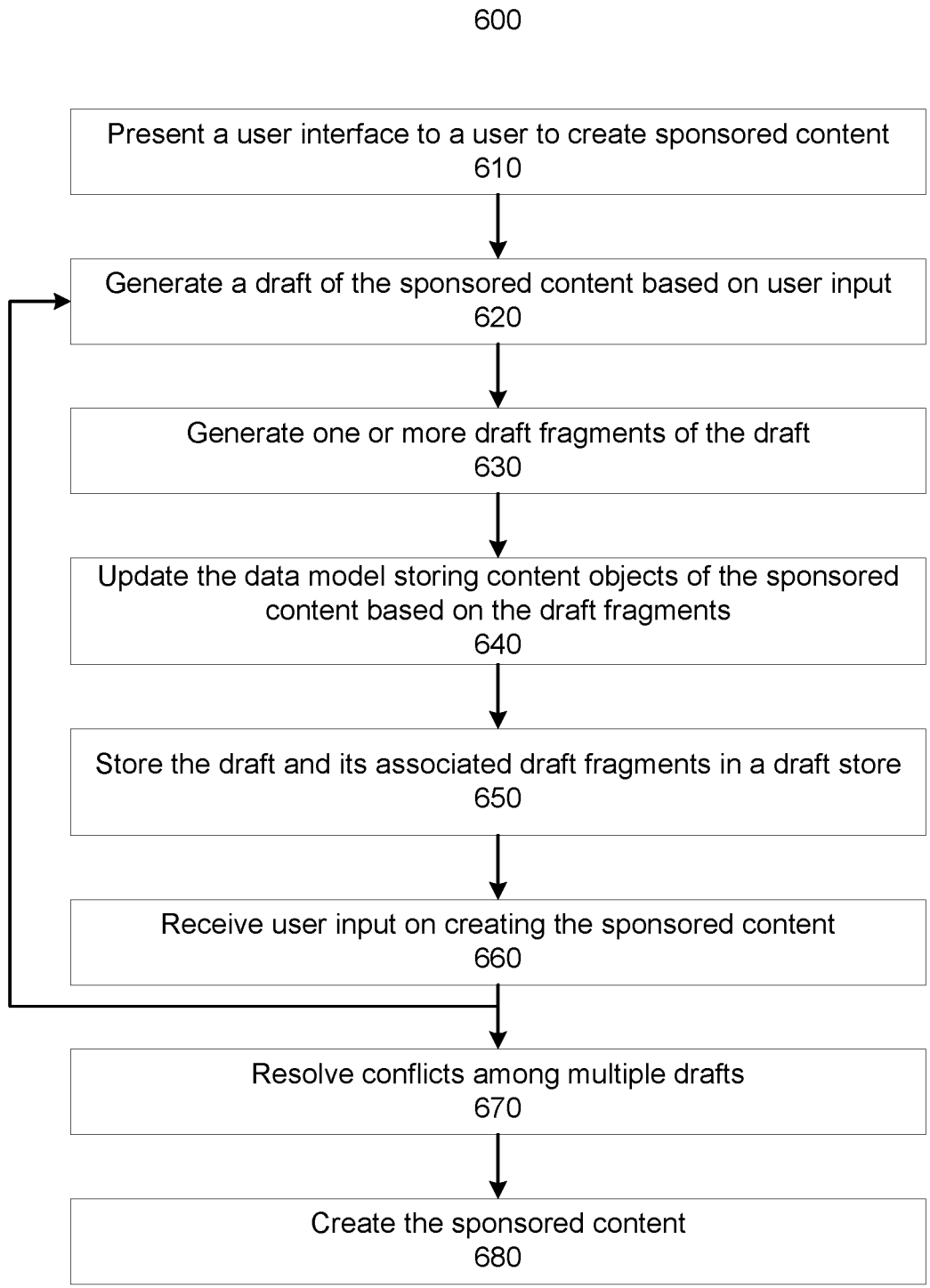
FIG. 6 is a flowchart illustrating a process for creating sponsored content through drafts and draft fragments in a content drafting system, according to one embodiment.

FIG. 6 is a flowchart illustrating a process for creating sponsored content through drafts and draft fragments in a content drafting system 150, according to one embodiment. Initially, the content drafting system 150 presents 610 a user interface to a user, e.g., a content provider 130, to create sponsored content. The user interface includes a selection tool for the content provider 130 to turn on draft mode. In response to the content provider 130 selecting the drafting mode and providing one creative, e.g., an image of a product, to be included in the sponsored content, the content drafting system 150 generates 620 a draft of the sponsored content. The 630 content drafting system 150 also generates 630 one or more draft fragments, e.g., a draft fragment indicating the creative being added to the sponsored content. The content drafting system 150 updates 640 the data model, e.g., the hierarchical object model, storing the content objects of the sponsored content based on the draft fragments, e.g., saving the changes made by the draft fragments into their corresponding placeholders. The content drafting system 150 stores 650 the draft and its associated draft fragments in a draft store, where the draft represents a first phase of the creation of the sponsored content.

The content drafting system 150 receives 660 additional user input, e.g., additional creatives to be added to the sponsored content. The content drafting system 150 repeats the steps 620-650 to capture a second phase of the creation of the sponsored content. The content drafting system 150 continues to create more drafts associated with the creation of the sponsored content until all the modifications made by the drafts and their draft fragments are materialized, e.g., approved by the content provider 130. The content drafting system 150 resolves 670 any conflicts among multiple drafts (to be further described below), and creates 680 the sponsored content. The content drafting system 150 presents the created sponsored content to the content provider 130 or targeting users specified by the content provider 130.

Figure 7:
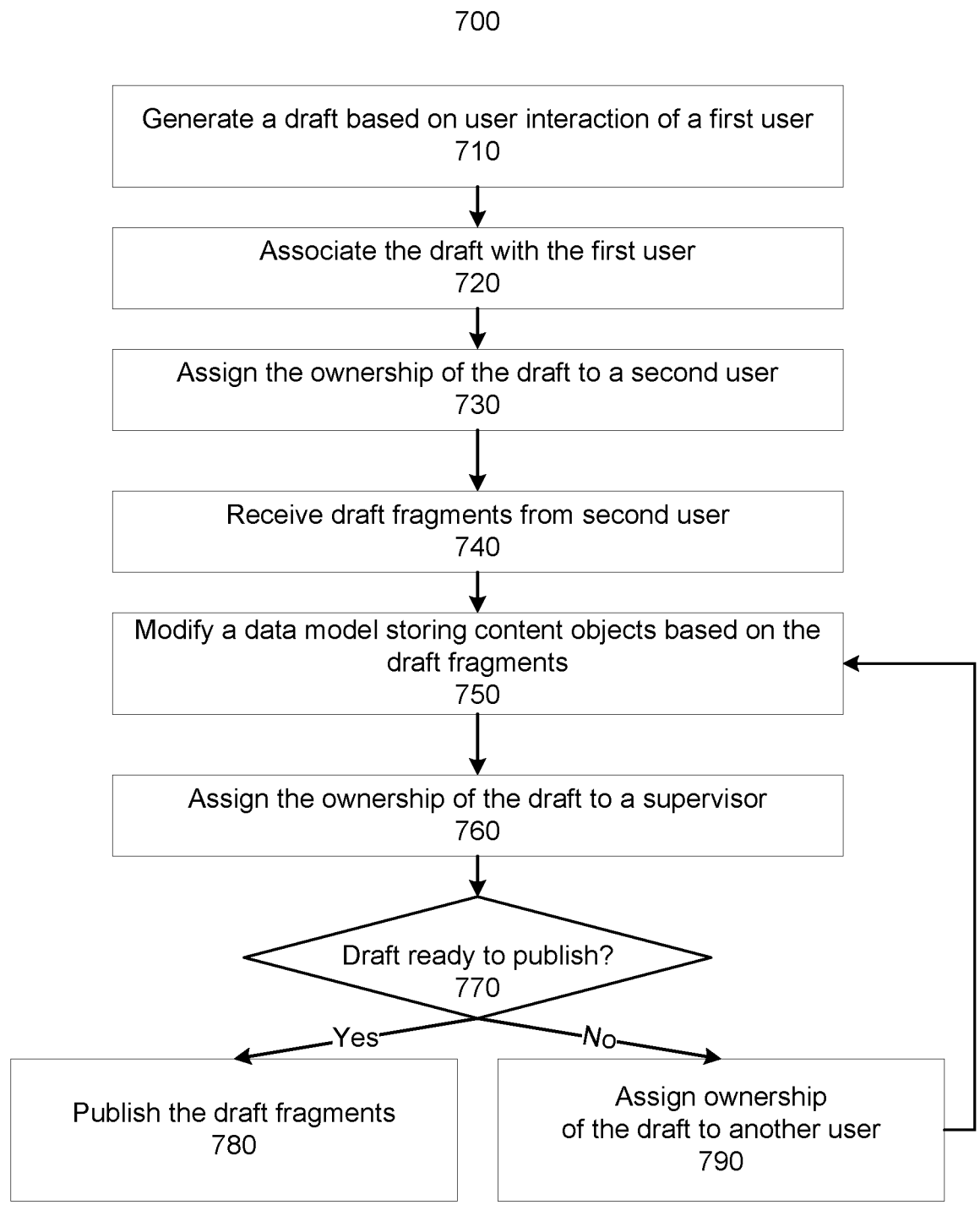
FIG. 7 is a flowchart illustrating a process for creating drafts of sponsored content by multiple users in a content drafting system, according to one embodiment.

The content drafting system 150 enables multiple creators/authors/editors associated with different phases of sponsored content creation. FIG. 7 is a flowchart illustrating a process for creating drafts of sponsored content by multiple users in a content drafting system 150, according to one embodiment. Initially, the content drafting system 150 generates 710 a draft of the sponsored content based on user interaction with a user interface presented to a first user for content creation. The content drafting system 150 associates 720 the draft with the first user, e.g., assigning the first user as an original owner of draft. In response to additional changes to be made to the sponsored content requested by a seconder user associated with the content creation, the content drafting system 150 assigns 730 the ownership of the draft to a second user, and receives 740 one or more draft fragments from the second user. The content drafting system 150 modifies 750 a data model storing various content objects of the sponsored content based on the draft fragments.

The content drafting system 150 may repeat the steps of 730 to 750 multiple times for additional changes made by the same or different users associated with the content creation. Response to all changes being drafted by draft fragments, the content drafting system 150 assigns 760 the ownership of the draft to an approver, e.g., a supervisor of the content provider 130, for final approval of the draft. The approver evaluates the draft to determine 770 whether the draft is ready for publishing. If the draft is ready for publishing, the content drafting system 150 publishes 780 the draft and its associated draft fragments; if the draft needs further changes, the content drafting system 150 assigns 790 the ownership of the draft to another user or a previous editor for creating the changes through additional draft fragments. The content drafting system 150 repeats the steps 750 to 780/790 until the draft is published or deleted based on the input from the content provider 130.

IV. Asynchronous Updating

Referring back to FIG. 2, the online system 140 also includes a task async engine 170. The task async engine 170 of an online system 140 allows tasks (e.g., API calls for publishing draft fragments, drafts, and sponsored content) to be executed in a way that takes into account how busy the online system 140 is currently, considers the best order of task execution, and allows a failed task to be tried again rather than just being allowed to fail.

In one embodiment, the task async engine 170 is configured to publish drafts of sponsored content, however, a task async engine can be configured to asynchronously order and execute any suitable tasks based on any suitable factors. The task async engine 170 has an execution module 260 and a conflict module 270 and an execution log 275 to store data related to executing tasks, for example, publishing drafts of the sponsored content. The execution module 260 orders and attempts to execute tasks received by the task async engine in the determined order. For example, the execution module 260 receives one or more drafts associated with the sponsored content from the content provider 130, where each of the drafts represents a phase of the creation of the sponsored content, and each draft includes one or more changes made to the sponsored content. In some implementations changes to a content object of the sponsored content are represented by draft fragments. The execution module 260 learns the internal states of all of the content objects of the sponsored content from the corresponding structure, e.g, the object model storing the content objects of the sponsored content shown in FIG. 3. The task async engine 170 executes drafts associated with sponsored content and creates objects corresponding to the hierarchical structure of the sponsored content (e.g., campaign, content item set and content items).

The conflict module 270 evaluates the received tasks to determine and resolve conflicts that arise between tasks. For example, the conflict module 270 can evaluate drafts and their associated draft fragments associated with the sponsored content to identify any conflict before publishing the drafts of the sponsored content. In one embodiment, the conflict module 270 determines whether a content object of the sponsored content was changed by a draft fragment. For example, when a draft fragment is created for an existing content object, e.g., campaign object, the drafts module 250 of the content drafting system 150 computes a hashcode for the content object, e.g., by concatenating all the fields of the content object and applying a hash scheme (e.g., MD5 hash) to the concatenated fields. The drafts module 250 stores the hashcode value of the content object in the draft fragment object.

When publishing the content object, the conflict module 270 retrieves the current content object from a storage and computes the hashcode of the current content object again using the same hash function. If the new hashcode value of the current content object matches the hashcode value stored in the draft fragment object, the conflict module 270 determines that the content object was not changed since the corresponding draft fragment was created. Thus, there is no conflict, and the conflict module 270 instructs the task async engine to persist the changes made by the draft fragment to the content object. If the new hashcode of the content object does not matches the one stored in the draft fragment, it indicates that the content object has changed since the draft fragment was created. The conflict module 270 needs to determine whether there is a conflict.

A conflict arises in various scenarios, including (1) the same field of a content object being updated by multiple draft fragments; (2) a related field being updated by a draft fragment; (3) a content object being deleted; and (4) parent content object and/or grandparent content object being deleted. In one embodiment, the conflict module 270 identifies conflicts associated with a content object by comparing the old values of all fields changed in a draft fragment with the current field values of the content object. If all the values in the draft fragment matches the current values of the content object, the conflict module 270 determines that there are no conflicts in the draft and the changes from the draft fragment are made to the content object. If one or more of the old values in the draft fragment do not match the current values in the content object, the conflict module 260 determines that there is a conflict in the draft and needs to resolve the conflict.

In one embodiment, the conflict module 270 instructs the task async engine 170 to present a warning message to the creator of the sponsored content on a user interface, e.g., the draft drawer/bar. The presented warning message can include three values of the field of the content object that caused the conflict: current value of the field of the content object, old value of the field from the draft fragment, and the new value from the draft fragment. In another embodiment, the conflict module 270 displays a warning message to the creator of the sponsored content and exits the publishing process without publishing the draft.

With the task async engine 170, the online system 140 can efficiently identify failure in the content publishing function, and can avoid publishing of sponsored content of failed content item sets but allow publishing of sponsored content of content item sets that succeed. With the task async engine 170, the online system 140 can also queue long jobs, which improves the system performance.

Figure 8:
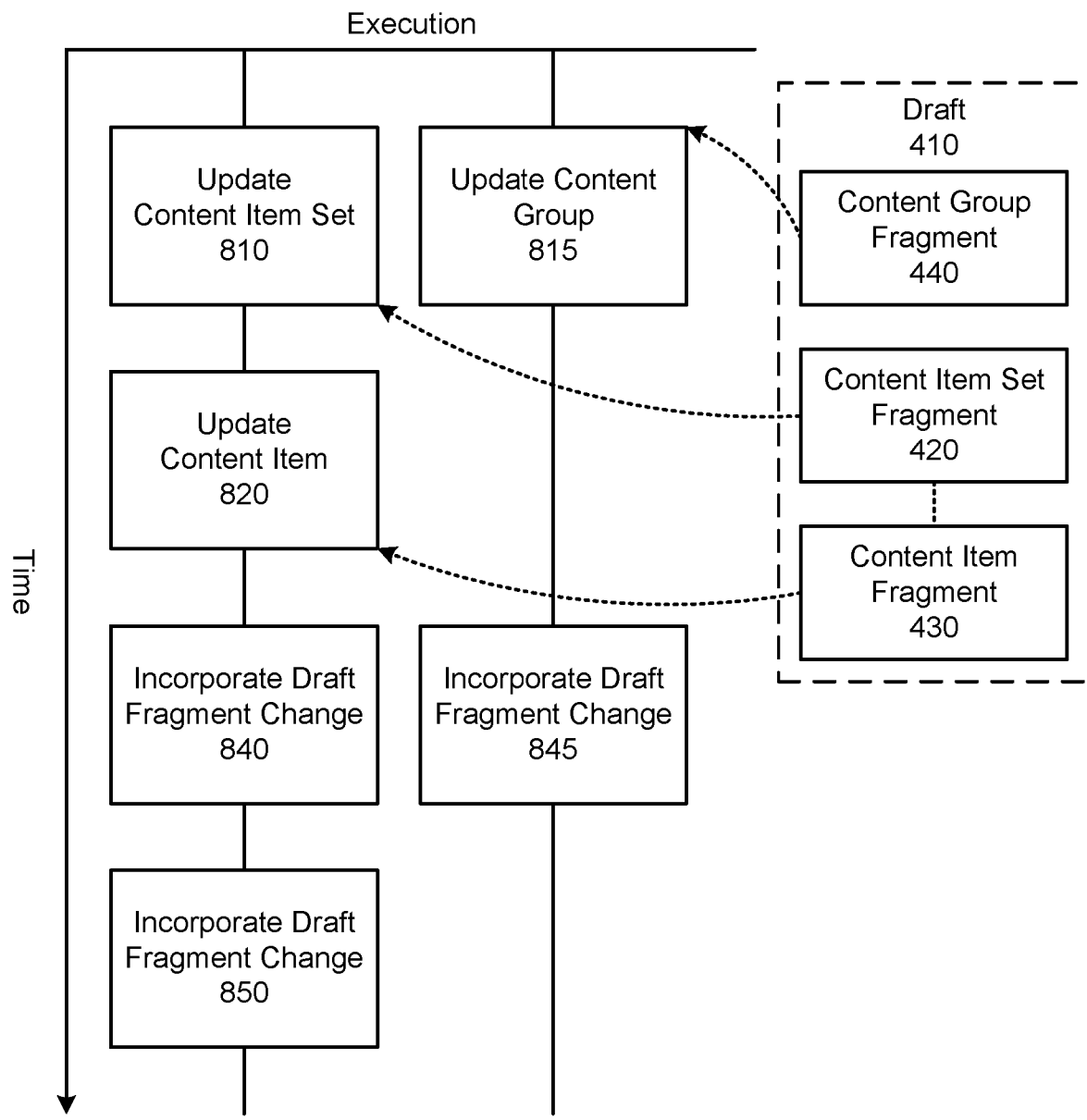
FIG. 8 is a chart illustrating changes to a draft of sponsored content implemented sequentially in a content drafting system, according to one embodiment.

FIG. 8 is a chart illustrating changes to sponsored content implemented sequentially in a content drafting system, according to one embodiment. The draft 410 includes the content group fragment 440, content item set fragment 420, and content item fragment 430. The content item set fragment 420 is to update the content item set 810, the content group fragment 440 to update content group 815, and the content item fragment 430 to update content item 820. The changes from the draft fragments 420, 430, and 440 are incorporated at the draft fragment changes operations 840, 845 and 850. The chart 800 outlines a sequence for implementing changes from these draft fragments. For example, the content item set fragment 420 is associated with the update content item set operation 810, the content item fragment 430 and the content group fragment 440 are similarly associated with the update content item operation 820 and update content group operation 815, respectively. The task async engine 170 can determine an efficient sequence to implement the changes. In the embodiment of FIG. 8, the chart 800 includes two parallel sequence threads through which changes to the sponsored content can be implemented, though sequences generated in other embodiments can have more parallel sequence threads depending on the architecture and implementation of the online system 140, the content store 210, and the task async engine 170.

To determine an efficient sequence of incorporating changes to the sponsored content, the task async engine 170 can take into account a variety of factors to determine the priority and order of changes to implement. The task async engine 170 can determine multiple series of content items to be implemented sequentially. In some embodiments, changes to content objects based on the draft fragments are implemented in a top down order, where higher level content objects are modified before related lower level content items. In some implementations, each draft fragment is published after draft fragments associated with the parent of the content object of that draft fragment and/or other draft fragments associated with content objects of a higher level are published. For example, the content item set fragment 420 should be published prior to the content item fragment 430 as the content item will depend on the content item set based on the relationship outlined in the draft fragment. Similarly, if the update content item operation 820 is implemented successfully and the update content item set operation 820 later fails or is not correctly implemented, the resulting content item will not have an implemented content item set to reference. Therefore, content items later in a series can depend on the previous content item in the series. Similarly, series of content items can be determined based on a date of creation or modification associated with draft fragments. In some implementations, draft fragments associated with the same content object of the sponsored content are published beginning with the oldest change. Similarly, each newer draft fragment can reference the state of the content object with all previous changes implemented, so each draft fragment associated with the content object depends on all previous draft fragments for that object.

The task async engine 170 can also select changes to be implemented in parallel. For example, the update content group operation 815 can be implemented in parallel to the update content item set operation 810. In some embodiments, the task async engine 170 tries to maximize the number of changes published in parallel, but the task async engine 170 can also take into account system performance of the online system 140 when determining a sequence of changes. For example, an online system 140 may have a maximum number of tasks that can be implemented in parallel.

Figure 9:
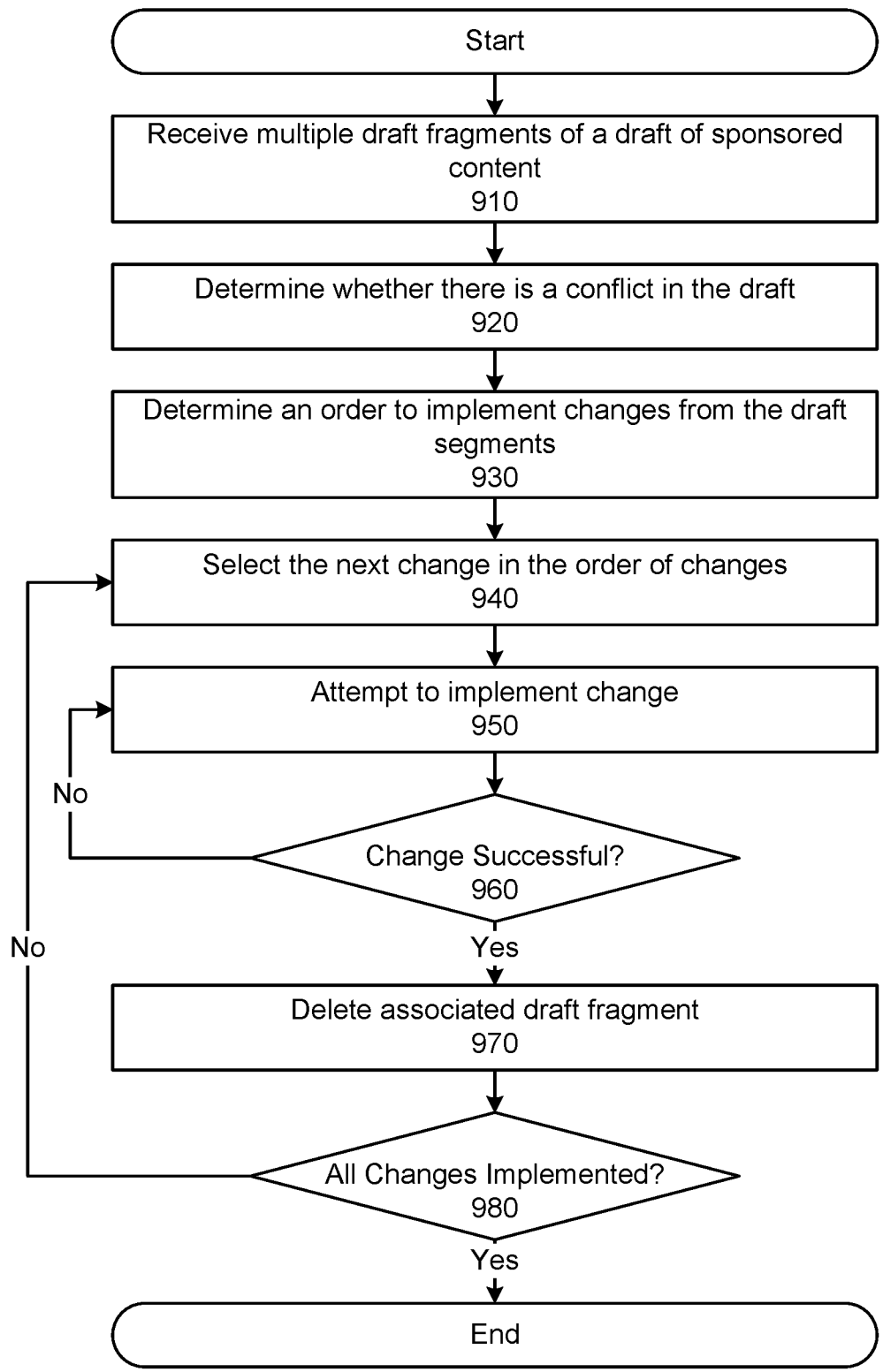
FIG. 9 is a flowchart illustrating a process for applying changes to sponsored content of an online system, according to one embodiment.

FIG. 9 is a flowchart illustrating a process for applying changes to sponsored content of an online system 140, according to one embodiment. The process 900 begins when multiple draft fragments are received 910, each draft fragment describing a change to a content object of the sponsored content. The draft fragments are analyzed to determine 920 whether there is a conflict in the draft the sponsored content. At step 930, the task async engine 170 determines an order to implement the changes based on the draft fragments. A change from a draft fragment is selected 940 by the task async engine 170, which attempts 950 to implement the change, e.g., publishing the draft fragment. If the change is successfully implemented at step 960, the associated draft fragment is deleted at step 970; if there are further changes to implement, the next change in sequence is selected at step 940 and attempted to be implemented at step 950. If the change was not successful at step 960, the change can be attempted again 950. In some embodiments, after a threshold number of attempts, the change and any dependent changes are removed from the sequence. Once all changes in the order are published successfully at step 980, the process ends.

VII. Additional Considerations

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
a processor; and
a memory storing instructions, which when executed by the processor, cause the processor to:
receive, by an online system from a content provider, a draft for a content item associated with a plurality of content objects arranged in a hierarchical structure, the draft associated with a plurality of draft fragments, each draft fragment comprising a modification to a field of a content object of the plurality of content objects;
analyze the plurality of draft fragments associated with the draft to identify one or more changes in any field, wherein the one or more changes comprises at least one of a deletion, subtraction, or modification;
determine whether there is a conflict in the draft based on the identified one or more changes during the analysis of the draft fragments;
resolve, responsive to detecting a conflict in the draft, the conflict in the draft of the content item based on at least a variety of priority factors to determine priority and order of changes to implement, wherein the variety of priority factors and order of changes to implement is used to:
determine multiple series of content items to be implemented sequentially, and
select changes to be implemented in parallel, wherein the selection of changes to be implemented in parallel:
takes system performance into account when determining a sequence of changes to be implemented in parallel, including a maximum number of tasks that can be implemented in parallel;
order the draft fragments of the plurality of draft fragments into an order to be published based on the position within the hierarchical structure of the content object associated with each draft fragment; and
publish, responsive to the ordering, the draft by modifying, in a sequence based on the order, one or more content objects of the plurality of content objects according to each draft fragment of the plurality of draft fragments by, for each of the plurality of draft fragments in the order to be published:
apply the modification of the draft fragment to the associated content object of the plurality of content objects.

2. The method of claim 1, where the draft is identified by a unique identification, the draft has a plurality of fields, and each field has at least one value.

3. The method of claim 1, where a draft fragment associated with the draft is identified by a unique identification, the draft fragment has a plurality of fields, and each field has a value.

4. The method of claim 1, wherein analyzing the plurality of draft fragments associated with the draft comprises:
identifying a plurality of fields of the content object associated with a draft fragment of the plurality of draft fragment, each field of the content object having a value;
generating a hashcode of the content object based on the plurality of fields and associated values of the plurality of the fields of the content object; and
storing the hashcode of the content object in a data store.

5. The method of claim 4, wherein generating the hashcode of the content object comprises:
concatenating the plurality of fields of the content object;
applying a hash function to the concatenated plurality of fields of the content object; and
generating the hashcode of the content object based on the application of the hash function.

6. The method of claim 4, further comprising:
retrieving a current content object associated with the draft fragment, the current content object corresponding to the content object for which the draft fragment was created;
generating a current hashcode of the current content object based on the plurality of fields of the current content object;
comparing the hashcode of the content object stored in the data store with the current hashcode of the current content object; and
determining a conflict in the draft in response to the stored hashcode of the content object and the current hashcode of the current content object not matching with each other.

7. The method of claim 1, wherein resolving the conflict in the draft of the content item comprises:

displaying a message to the content provider, the message indicating a conflict identified in the draft.

8. The method of claim 1, wherein a conflict in a draft arises in response to one of following events:
   a plurality of draft fragments comprising a modification to a same field of a content object of the plurality of content objects;
   one or more draft fragments comprising a modification to a field of an old version of a content object which has since been updated;
   one or more draft fragments comprising a modification to a field of a content object that has been deleted; and
   one or more draft fragments comprising a modification to a field of a content object whose parent object or grandparent object in a hierarchical structure of content objects has been deleted.

9. The method of claim 1, further comprising selecting a first subset of draft fragments of the plurality of draft fragments for publication based on the analysis, wherein publishing the draft and selected one or more draft fragments comprises publishing the draft and the first subset of draft fragments.

10. A non-transitory computer readable storage medium comprising instructions which when executed by a processor, cause the processor to perform the steps of:
   receiving, by an online system from a content provider, a draft for a content item associated with a plurality of content objects arranged in a hierarchical structure, the draft associated with a plurality of draft fragments, each draft fragment comprising a modification to a field of a content object of the plurality of content objects;
   analyzing the plurality of draft fragments associated with the draft of the content item to identify one or more changes in any field, wherein the one or more changes comprises at least one of a deletion, subtraction, or modification;
   determining whether there is a conflict in the draft based on the identified one or more changes during the analysis of the draft fragment;
   resolving, responsive to a conflict in the draft, the conflict in the draft of the content item based on at least a variety of priority factors to determine priority and order of changes to implement, wherein the variety of priority factors and order of changes to implement is used to:
      determine multiple series of content items to be implemented sequentially, and
      select changes to be implemented in parallel, wherein the selection of changes to be implemented in parallel:
         takes system performance into account when determining a sequence of changes to be implemented in parallel, including a maximum number of tasks that can be implemented in parallel;
   ordering the draft fragments of the plurality of draft fragments into an order to be published based on the position within the hierarchical structure of the content object associated with each draft fragment; and
   publishing, responsive to the ordering, the draft by modifying, in a sequence based on the order, one or more content objects of the plurality of content objects according to each draft fragment of the plurality of draft fragments by, for each of the plurality of draft fragments in the order to be published:
      applying the modification of the draft fragment to the associated content object of the plurality of content objects.

11. The computer readable medium of claim 10, where the draft is identified by a unique identification, the draft has a plurality of fields, and each field has at least one value.

12. The computer readable medium of claim 10, where a draft fragment associated with the draft is identified by a unique identification, the draft fragment has a plurality of fields, and each field has a value.

13. The computer readable medium of claim 10, wherein analyzing the plurality of draft fragments associated with the draft comprises:
   identifying a plurality of fields of the content object associated with a draft fragment of the plurality of draft fragment, each field of the content object having a value;
   generating a hashcode of the content object based on the plurality of fields and associated values of the plurality of the fields of the content object; and
   storing the hashcode of the content object in a data store.

14. The computer readable medium of claim 13, wherein generating the hashcode of the content object comprises:
   concatenating the plurality of fields of the content object;
   applying a hash function to the concatenated plurality of fields of the content object; and
   generating the hashcode of the content object based on the application of the hash function.

15. The computer readable medium of claim 13, wherein the steps further comprise:
   retrieving a current content object associated with the draft fragment, the current content object corresponding to the content object for which the draft fragment was created;
   generating a current hashcode of the current content object based on the plurality of fields of the current content object;
   comparing the hashcode of the content object stored in the data store with the current hashcode of the current content object; and
   determining a conflict in the draft in response to the stored hashcode of the content object and the current hashcode of the current content object not matching with each other.

16. The computer readable medium of claim 10, wherein resolving the conflict in the draft of the content item comprises:
   displaying a message to the content provider, the message indicating a conflict identified in the draft.

17. The computer readable medium of claim 10, wherein a conflict in a draft arises in response to one of following events:
   a plurality of draft fragments comprising a modification to a same field of a content object of the plurality of content objects;
   one or more draft fragments comprising a modification to a field of an old version of a content object which has since been updated;
   one or more draft fragments comprising a modification to a field of a content object that has been deleted; and
   one or more draft fragments comprising a modification to a field of a content object whose parent object or grandparent object in a hierarchical structure of content objects has been deleted.

18. The computer readable medium of claim 10, wherein the steps further comprise selecting a first subset of draft fragments of the plurality of draft fragments for publication based on the analysis, and wherein publishing the draft and selected one or more draft fragments comprises publishing the draft and the first subset of draft fragments.

19. A system, comprising:
a processor; and
a memory storing instructions, which when executed by the processor, cause the processor to:
   receive, by an online system from a content provider, a draft for a content item associated with a plurality of content objects arranged in a hierarchical structure, the draft associated with a plurality of draft fragments, each draft fragment comprising a modification to a field of a content object of the plurality of content objects;
   analyze the plurality of draft fragments associated with the draft to identify one or more changes in any field, wherein the one or more changes comprises at least one of a deletion, subtraction, or modification;
   determine whether there is a conflict in the draft based on the identified one or more changes during the analysis of the draft fragments;
   resolve, responsive to detecting a conflict in the draft, the conflict in the draft of the content item based on at least a variety of priority factors to determine priority and order of changes to implement, wherein the variety of priority factors and order of changes to implement is used to:
      determine multiple series of content items to be implemented sequentially, and
      select changes to be implemented in parallel, wherein the selection of changes to be implemented in parallel:
         takes system performance into account when determining a sequence of changes to be implemented in parallel, including a maximum number of tasks that can be implemented in parallel;
   order the draft fragments of the plurality of draft fragments into an order to be published based on the position within the hierarchical structure of the content object associated with each draft fragment; and
   publish, responsive to the ordering, the draft by modifying, in a sequence based on the order, one or more content objects of the plurality of content objects according to each draft fragment of the plurality of draft fragments by, for each of the plurality of draft fragments in the order to be published:
      apply the modification of the draft fragment to the associated content object of the plurality of content objects.

* * * * *